United States Patent [19]

Otto

[11] Patent Number: 5,044,763
[45] Date of Patent: Sep. 3, 1991

[54] MACHINE FOR THE PROCESSING OF FOODSTUFFS OR FOR THE PREPARATION OF PHARMACEUTICAL AND CHEMICAL PRODUCTS

[75] Inventor: Friedrich Otto, Hameln, Fed. Rep. of Germany

[73] Assignee: A. Stephan u. Soehne GmbH & Co., Hameln, Fed. Rep. of Germany

[21] Appl. No.: 433,006

[22] Filed: Nov. 7, 1989

[30] Foreign Application Priority Data

Nov. 7, 1988 [DE] Fed. Rep. of Germany ... 8813901[U]

[51] Int. Cl.[5] .............................................. B01F 7/22
[52] U.S. Cl. ..................................... 366/309; 366/314
[58] Field of Search ............... 366/314, 205, 279, 292, 366/325, 329, 330, 326, 309, 311, 312, 313, 244, 245, 247, 248, 250, 251

[56] References Cited

U.S. PATENT DOCUMENTS

| | | | |
|---|---|---|---|
| 3,024,010 | 3/1962 | Sperling | 366/314 |
| 4,045,185 | 8/1977 | Azemar | 366/309 |
| 4,863,278 | 9/1989 | Otto | 366/314 |

FOREIGN PATENT DOCUMENTS 1432520 4/1976 United Kingdom .
1475025 6/1977 United Kingdom .

Primary Examiner—Robert W. Jenkins
Attorney, Agent, or Firm—Foley & Lardner, Schwartz, Jeffery, Schwaab, Mack, Blumenthal & Evans

[57] ABSTRACT

A processing machine is provided having a tool comprising at least two identical, diametrically opposite mixing fingers which revolve in the same horizontal plane. These mixing fingers have a round cross-section, are arranged very close above the bowl bottom and protrude with their free radially outer, slightly upwardly bent end into the bowl radius. Further, the mixing fingers are provided between the bowl bottom and bowl wall, and are adapted in contour outline approximately to the bowl radius. By using a round profile for the mixing fingers, both a pressure component against the bowl bottom and a raising component away from the bowl bottom are obtained. Also, due to the very small gap between the mixing fingers and the bowl bottom, an adequately high turbulence is generated so that material in this area is more fully mixed. Two mixing blades may also be provided above the mixing fingers and offset by 90° in order to ensure proper mixing even of small amounts of material.

13 Claims, 4 Drawing Sheets

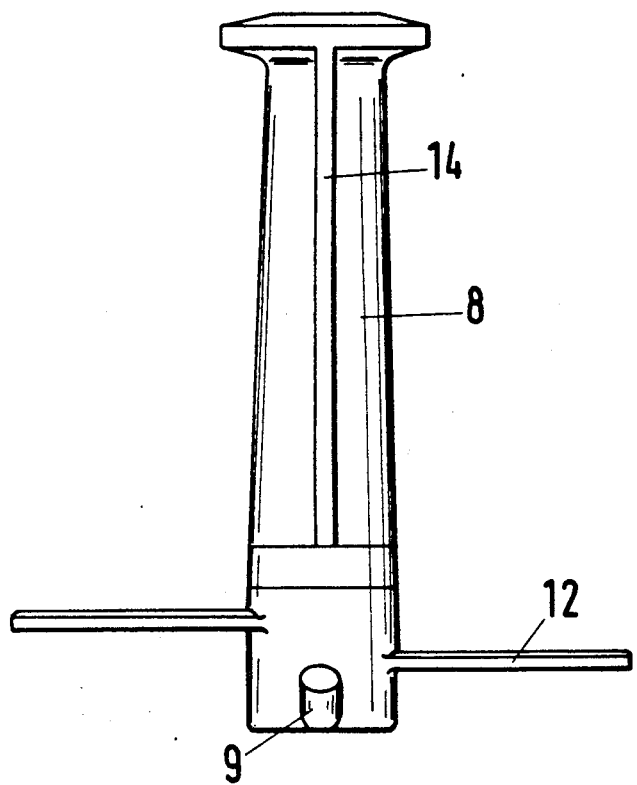

MACHINE FOR THE PROCESSING OF FOODSTUFFS OR FOR THE PREPARATION OF PHARMACEUTICAL AND CHEMICAL PRODUCTS

BACKGROUND OF THE INVENTION

1. Field of the Invention

The invention relates to a machine for the processing of foodstuffs or for the preparation of liquid or pasty pharmaceutical and chemical products.

2. Discussion of the Related Art

In preparation of foodstuffs, pharmaceuticals or chemical products, it is well known to provide a machine having a bowl and a motor shaft which protrudes perpendicularly through the bowl bottom and into the bowl. Typically, this motor shaft can be driven at high speed by a motor arranged beneath the bowl and is adapted to receive a sleeve-shaped tool carrier which is rotatably fixed but releasable at its upper free end. The sleeve-shaped tool carrier also has radially extending tools at its lower end.

An example of such a machine is disclosed in German Gebrauchsmuster 88 09 812.5. In such processing machines, sometimes minimal amounts of a product must also be prepared with satisfactory quality, a minimal amount here meaning, for example, approximately one thirtieth of the gross content of the bowl. With a bowl having a content of 5 liters, an amount of 0.17 liters would therefore represent a minimal amount. To produce the products described above it is particularly important that, when working or mixing constituents of a formulation, they can be processed at speeds of about 300 to 3000 rpm. When using previously known tools, due to the design of these tools and with the effect of the centrifugal forces, the constituents of the formulation are often sprayed onto the bowl wall and consequently can no longer be automatically mixed to form the required minimal amount. This requires a frequent opening of the bowl cover in order to scrape off the bowl wall, causing the preparation process to be prolonged. Obviously, this is never desirable and in many cases will be entirely unacceptable.

With previously known machines, it has also proven largely impossible with such minimal amounts to achieve adequate mixing since the revolving tools will not reach the material on the bowl bottom. This problem arises in particular when mixing highly pasty or highly viscous materials. However, this problem does not occur with previously known machines if the bowl is filled at least up to one third of its capacity, since an adequate turbulence and a pressure of the product in the direction of the bowl bottom can then be generated.

SUMMARY OF THE INVENTION

Accordingly, it is an object of the present invention to provide a tool for the above-described machine with which even minimal amounts can be adequately worked and processed.

This object and others are achieved according to the present invention by providing a tool comprising at least two identical, diametrically opposite mixing fingers which revolve in the same horizontal plane. These mixing fingers have a round cross-section, are arranged very close above the bowl bottom and protrude with their free radially outer, slightly upwardly bent end into the bowl radius. Further, the mixing fingers are provided between the bowl bottom and bowl wall, and are adapted in contour outline approximately to the bowl radius.

By using a round profile for the mixing fingers, both a pressure component against the bowl bottom and a raising component away from the bowl bottom are obtained. Also, due to the very small gap between the mixing fingers and the bowl bottom, an adequately high turbulence is generated so that material in this area is more fully mixed.

Whenever material above the mixing fingers is to be processed, it is advantageous if the tools additionally comprise at least two identically designed mixing blades, which are arranged above the mixing fingers and offset by 90°. Preferably, these blades are twisted about their longitudinal axis by an acute setting angle ($\alpha$) in such a way that, seen in the direction of revolution, the leading edge of the mixing blade lies slightly higher than its trailing edge. It is advantageous if the mixing blades extend in radial direction nearly to the bowl wall.

With the aid of these mixing blades, the material above the mixing fingers can be forced up and carried down again, so that an intensive mixing interchange of the complete formulation is ensured.

In the case of highly viscous materials, material may sometimes collect on the bowl wall as a ring above the mixing blades. Since this material can then no longer be reached by the mixing blades, it is advantageous if the bowl is closed by a bowl cover having centrally mounted a transporting blade. The transporting blade can be rotated via a hand crank or the like about a vertical axis and bears against the bowl wall with a scraping edge, which extends downward to immediately above the plane of revolution of the upper mixing blade. By actuation of the transporting blade, the product which may become deposited on the bowl wall above the mixing blades can be fed back to the revolving tools.

In addition to mixing all constituents of the formulation, it may also be necessary to cut the material. In this case, it is beneficial if the leading edge of the mixing blades is designed as a knife cutting edge.

In some circumstances, it may also be necessary also to reduce the constituents of the formulation in size by impact. In this case, the tool must hit product particles at high speed, so that they are shattered or worn down. In pharmacy parlance, this processing method is called "trituration". For this purpose it is advantageous if the leading edge of the mixing blades is designed as a baffle surface.

In order to be able easily to perform tool exchange, it is expedient to fasten the mixing blades interchangeably on the tool carrier or, alternatively, to exchange the complete tool carrier for a tool carrier fitted with other tools.

BRIEF DESCRIPTION OF THE DRAWINGS

FIG. 5 shows the tool carrier of FIG. 3 in a position rotated through 90° as in FIG. 2.

DETAILED DESCRIPTION OF THE PREFERRED EMBODIMENTS

Figure 1:
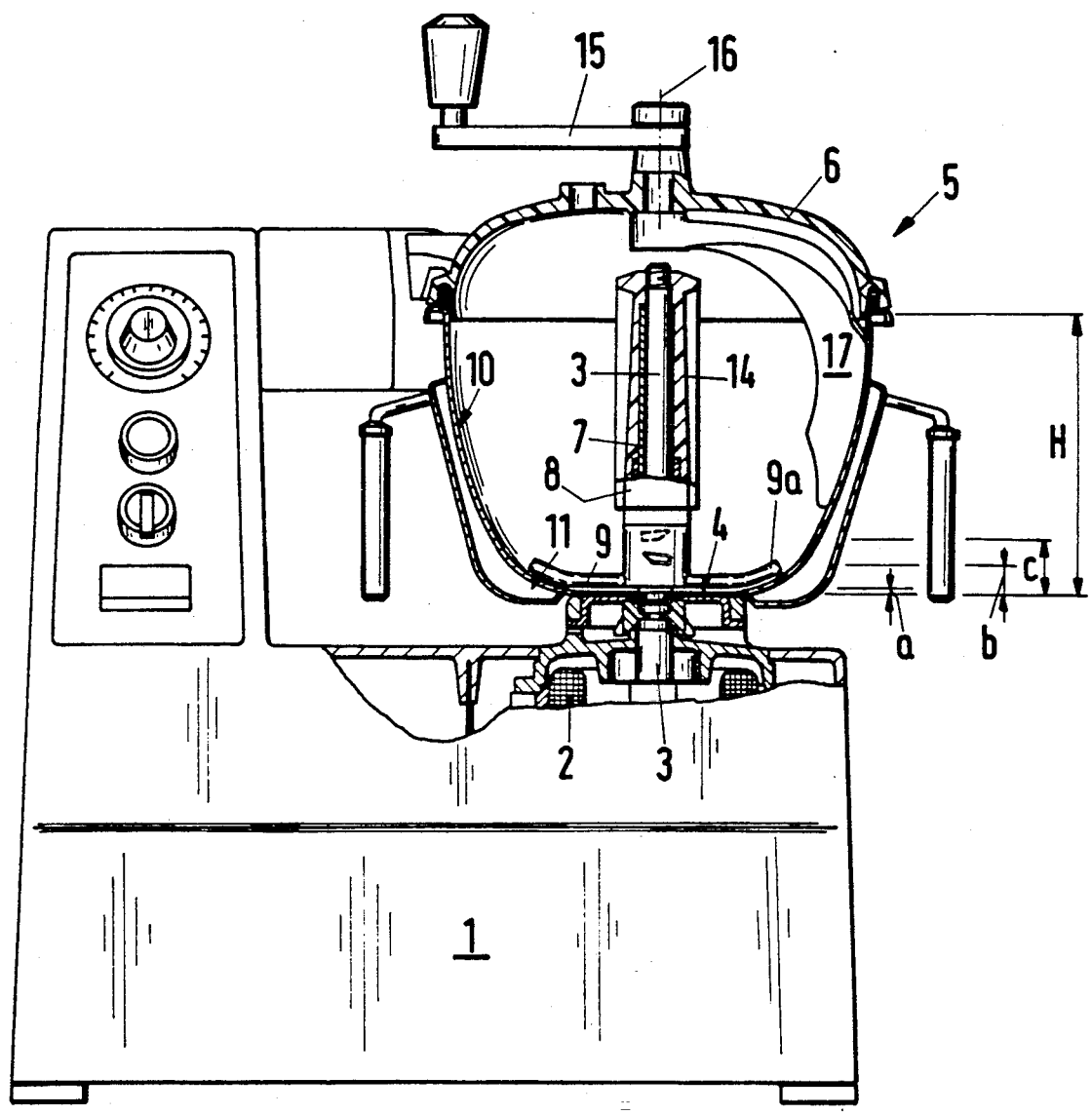
FIG. 1 is a machine according to the present invention in front view and partially in a vertical longitudinal section.

The present invention, as shown in FIG. 1, contemplates a machine having a stand 1, which encloses, inter alia, a motor 2, the motor shaft 3 of which passes centrally through the bowl bottom 4 of a bowl 5 and protrudes perpendicularly upward into the bowl 5. Welded into the shaft passage opening of the bowl bottom 4 is an upright tube 7. A tool carrier engages without contact over the tube 7 and is fitted securely against rotation but releasably at the upper free end of the motor shaft 3. The upright tube 7 protrudes higher than the greatest possible filling level of the bowl 5. The bowl 5 is closed by a bowl cover 6.

The tool carrier 8 has radially extending tools at its lower end. The first of these are two identical, diametrically opposite mixing fingers 9, which revolve in the same horizontal plane. The mixing fingers 9 have a round cross-section and preferably a clear axial distance, a, from the bowl bottom 4 of about 2 mm. Free radially outer, slightly-upwardly bent ends 9a of the mixing fingers 9 protrude to the bowl radius 11, located between bowl bottom 4 and bowl wall 10, and are adapted in contour outline to the radius 11 (as shown, in particular, in FIG. 1).

Figure 2:
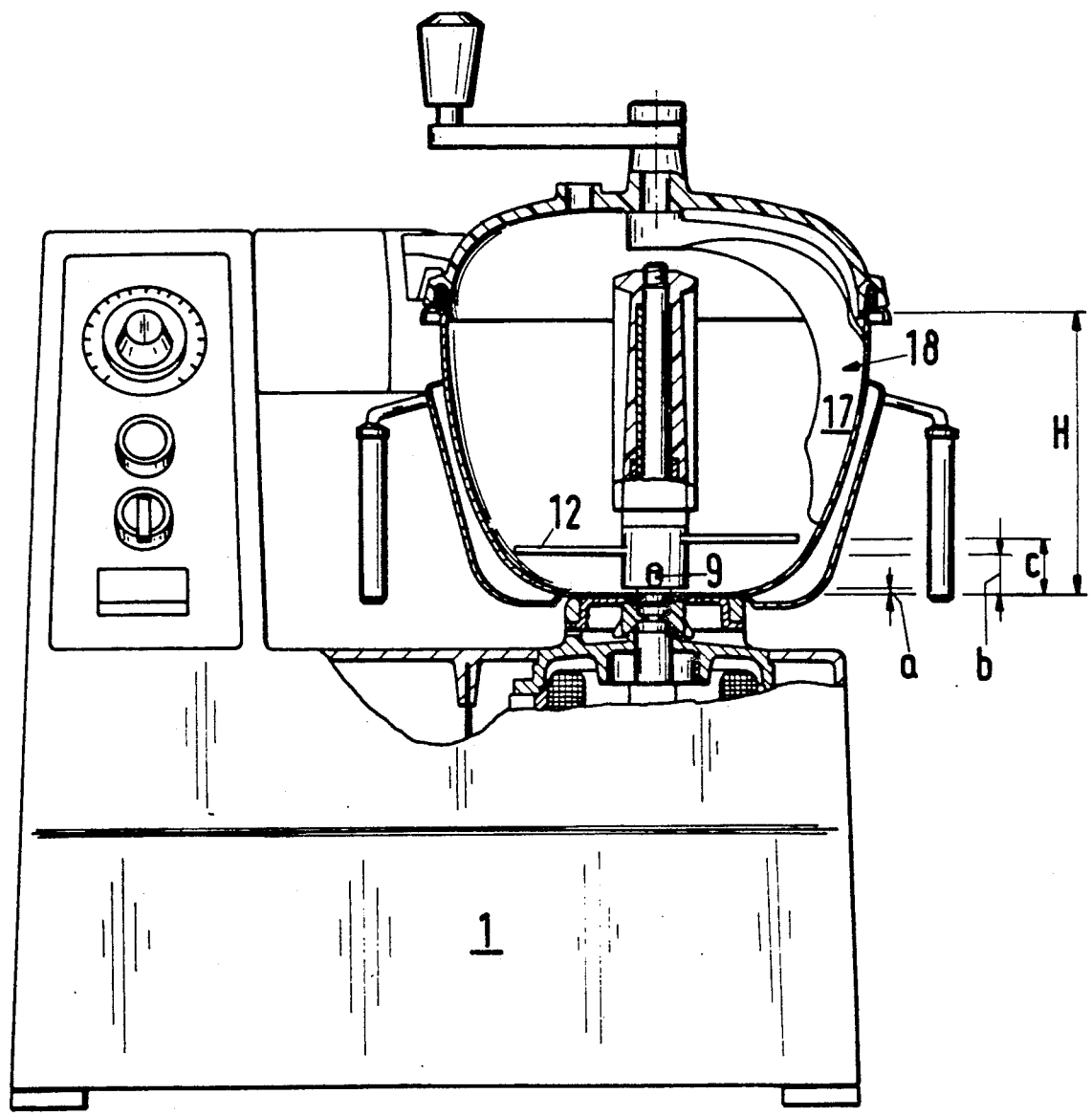
FIG. 2 is a representation according to FIG. 1 with a tool carrier rotated through 90°.
Figure 3:
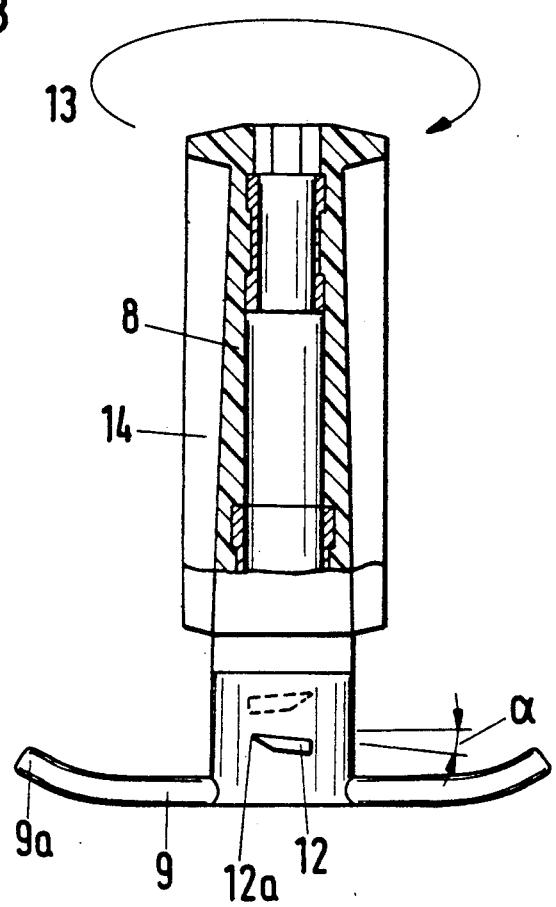
FIG. 3 shows the tool carrier of FIG. 1 on an enlarged scale.
Figure 4:
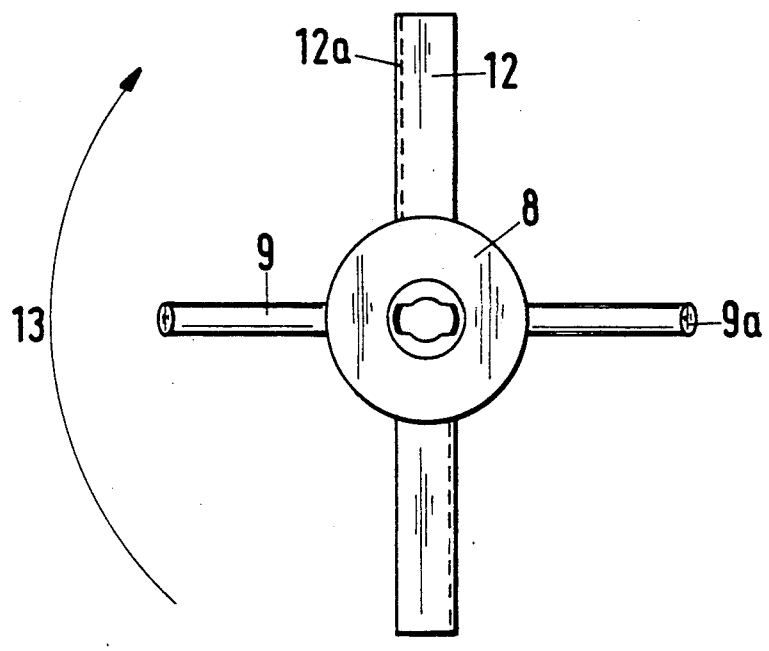
FIG. 4 shows the tool carrier of FIG. 3 in plan view.

Turning now to FIG. 2, the tools also comprise two mixing blades 12, which are arranged above the mixing fingers 9 offset by 90° and are twisted about their longitudinal axis by an acute setting angle α in such a way that, seen in the direction of revolution 13, the leading edge 12a of the mixing blade 12 lies slightly higher than its trailing edge. In particular, FIGS. 3 and 5 show that opposite mixing blades 12 are arranged at different axial distances b, c above the bowl bottom 4. In this arrangement, the two mixing blades 12 revolve at a height of about 1/5 to ⅓ of the bowl height H. The mixing blades 12 extend in a radial direction nearly to the bowl wall 10. In the exemplary embodiment represented, the leading edge 12a of the mixing blades 12 is designed as a knife cutting edge.

The tool carrier 8 has a circular cross-section in the axial area in which tools 9, 12 are fastened and is provided above the tools with two opposite centrifugal ribs 14.

Mounted centrally in the bowl cover 6 is a transporting blade 17, which can be rotated via a hand crank 15 about a vertical axis 16 and bears against the bowl wall 10 with a scraping edge 18. The blade 17 extends downward to immediately above the plane of revolution of the upper mixing blade 12.

In a preferred embodiment, the bowl 5 can have a maximum diameter of 225 mm and a height H (without bowl cover 6) of 150 mm. The distances a, b, c of the tools 9, 12 from the bowl bottom 4 are 2, 18 and 28 mm, respectively. The radial distance between the ends 9a of the mixing fingers 9 is 135 mm and the corresponding distance between the ends of the mixing blades 12 is about 155 mm. The setting angle α of the mixing blades 12 is preferably around 5°, while the profile diameter of the mixing fingers 9 is advantageously chosen as 8 mm.

It should become obvious to those skilled in the art that the present invention is not limited to the preferred embodiments shown and described.

What is claimed is:

1. A mixing machine, comprising;
   a container having a bottom portion and a wall portion which are connected through a radius portion;
   means, disposed in said container, for supporting a tool;
   means for rotating said support means; and
   a plurality of tools supported by said support means and extending radially from a lower end thereof;
   said plurality of tools comprising at least two diametrically opposed mixing fingers of rounded cross-section arranged to resolve in a horizontal plane in the vicinity of the container bottom portion;
   said mixing fingers each having a free outer end which is bent upwardly to contour approximately said radius portion;
   wherein said plurality of tools further comprise at least two mixing blades, which are arranged above the mixing fingers and offset by 90°; and
   said mixing blades being twisted about their longitudinal axes by an acute setting angle so that, in the direction of rotation, the leading edge of the mixing blade is higher than the tailing edge thereof.

2. The machine according to claim 1, wherein the clearance of the mixing fingers above the bottom portion is about 2 mm.

3. The machine according to claim 1, wherein the diameter of the mixing fingers is about 8 mm.

4. The machine according to claim 1, wherein the setting angle is about 5°.

5. The machine according to claim 1, wherein the opposite mixing blades are arranged at different axial distances above the bottom portion.

6. The machine according to claim 5, wherein the axial difference in height between the two mixing blades is about 10 mm.

7. The machine according to claim 1, wherein the mixing blades revolve at a height which is about 1/5 to ⅓ of the height of the container.

8. The machine according to claim 1, wherein the mixing blades radially extend substantially to the wall portion.

9. The machine according to claim 1, wherein the leading edge of the mixing blades is formed as a knife cutting edge.

10. The machine according to claim 1, wherein the leading edge of the mixing blades is formed as a baffle surface.

11. The machine according to claim 1, wherein said support means has a circular cross-section, at least at an area of contact with said plurality of tools.

12. The machine according to claim 11, wherein said support means is provided with at least two opposite centrifugal ribs above said area of contact.

13. The machine according to claim 1, further comprising a cover which covers the container, said cover including a centrally mounted transporting blade, which is rotatable about a vertical axis and bears against the wall portion with a scraping edge, and which extends downward to immediately above the plane of revolution of the plurality of tools.

* * * * *